Sept. 28, 1971  J. S. HUNTER ET AL  3,608,383
SINGLE AXIS RATE GYRO AND PIEZOTRANSISTOR
ANGULAR RATE DETECTOR
Filed Feb. 4, 1970

Joe S. Hunter
Little J. Little,
INVENTORS.

BY Harry M. Saragovitz
Edward J. Kelly
Herbert Berl
Harold W. Hilton

United States Patent Office 3,608,383
Patented Sept. 28, 1971

3,608,383
SINGLE AXIS RATE GYRO AND PIEZOTRANSISTOR ANGULAR RATE DETECTOR
Joe S. Hunter and Little J. Little, Huntsville, Ala., assignors to the United States of America as represented by the Secretary of the Army
Filed Feb. 4, 1970, Ser. No. 8,504
Int. Cl. G01c *19/18, 19/28*
U.S. Cl. 74—5.6
4 Claims

ABSTRACT OF THE DISCLOSURE

The single axis rate gyro has a piezotransistor pickoff for measuring angular rates of motion about a selected axis. Attitude deviation about the gyro sensitive axis develops corresponding stresses in a pair of piezotransistors arranged along the input axis. Output voltages are coupled from the transistor to a different amplifier when an angular rate occurs about the input axis. The output voltage from each transistor is proportional to the specific angular rate input. Error producing components of the output signal are canceled in the differential amplifier and a linear output component is doubled without amplification of unwanted signals. A pair of piezotransistors are fixed along the gyro input axis and are equally spaced on opposite sides of the spin axis. When an input angular rate occurs, a force transferring device responds to deviation between the spinning wheel and related support structure to place tension and compression on respective piezoelectrical components of the transistors, varying the voltage thereon and thereby changing the transistors output voltage. A current source maintains the transistors in a linear conductive state prior to receipt of stress forces and is adjustable to provide equal transistor output signals before stress is applied.

BACKGROUND OF THE INVENTION

A rate gyro is a single-degree-of-freedom gyro that measures angular rate of motion about a selected axis. A rate gyro includes a rotating mass or gyro wheel that spins about a spin axis, resisting any forces attempting to change the direction of the spin axis. Quadrature axes form a plane normal to the spin axis and intersect the axis at the approximate center of gravity of the wheel. These quadrature axes are the input or sensitive axis and the output axis of the gyro. When subjected to an angular rate about the input axis, a torque is developed about the output axis. A pickoff device for the rate gyro responds to the angular rate input to produce an output signal proportional to or a function of the input rate. An accurate output signal is produced by a precession of the gyro about the output axis. As the input angular rate increases from zero, the torque developed about the output axis increases. Constraint about the input axis makes the gyro relatively insensitive to rate inputs about the output axis. The gyro is insensitive to rates about the spin axis due to the relative wheel speed.

SUMMARY OF THE INVENTION

The apparatus of the present invention is a rate gyro having piezotransistor sensors on opposite sides of the spin axis thereof for measuring angular rates of motion about the sensitive axis. Stress forces are transferred to the transistors piezoelectric junction when the gyro has an input angular rate about the sensitive axis or input axis thereof, causing the gyro to precess about the output axis. Due to the sensitivity of the piezoelectrical junction of each transistor and the direct coupling of forces thereto, a very small gyro precession angle produces full scale response in the transistors and in a differential output circuit therefor. The sensitivity of the pickoff circuit allows a low wheel speed and low wheel mass to be utilized, thereby reducing windage problems and gravity sensitive errors.

DESCRIPTION OF THE PREFERRED EMBODIMENT

Figure 1:
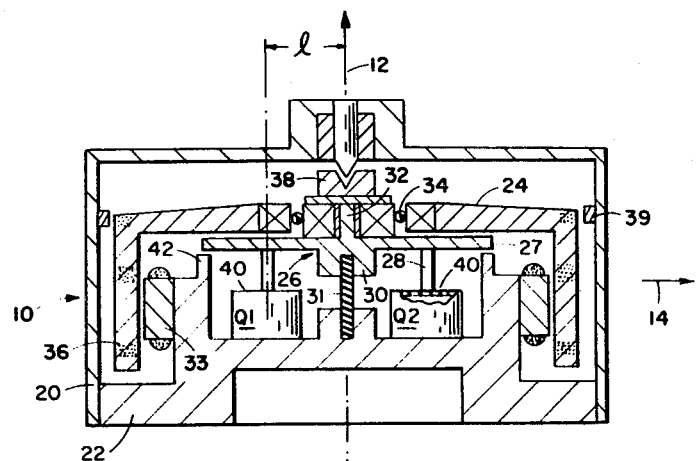
FIG. 1 is a sectional view of the rate gyro and piezoelectrical sensors.
Figure 2:
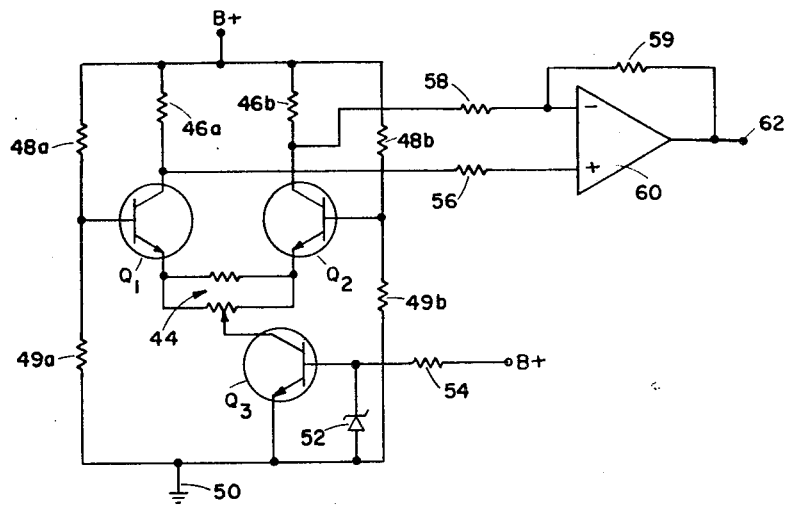
FIG. 2 is a schematic of the angular rate of motion detector circuit.

Referring now to the drawings wherein like numerals represent like parts in all figures, there is disclosed a preferred embodiment of the invention in FIGS. 1 and 2. FIG. 1 discloses a rate gyro 10 having a spin axis 12 and an input or sensitive axis 14, with input axis 14 lying in a plane normal to spin axis 12. An output axis 16 (FIG. 3) is orthogonal to the plane defined by axes 12 and 14. A gyro housing 20 and support structure 22 encompass and support a gyro wheel 24 and a displacement mechanism 26. Gyro wheel 24 is disposed for rotation about spin axis 12 and is brought up to speed by convenient means and then uncaged. Typically, a motor stator 33 is encompassed by spin rotor windings 36 for controlling speed of rotation. Caging mechanism 38 insures that gyro wheel 24 is not released until located in the desired spin axis direction. Damper 39 provides eddy current damping that reduce gyro oscillations. Displacement mechanism 26 is centered substantially in a plane formed by spin axis 12 and input axis 14, and includes a bar 27 that is parallel to axis 14. A pair of rods 28 project from bar 27 toward support 22 and are parallel to axis 12 on either side thereof. Rods 28 are located a distance *l* from spin axis 12. Displacement mechanism 26 has a hub or center 30 that is connected to one end of a spring hinge 31. Hinge 31 is connected to support structure 22 along the spin axis. A shaft member 32 of displacement mechanism 26 is opposite hub 30 and coaxial therewith, providing support for the inner race of bearings 34 and caging member 38. Thus, when the gyro wheel is caged, displacement mechanism 26 is caged. When uncaged, both wheel 24 and mechanism 26 are supported by spring 31, maintaining a biased pivotal relationship through spring 31 with the support structure.

First and second piezotransistor sensors Q1 and Q2 are mounted on structure 22 approximately equidistant from spin axis 12 on opposite sides thereof and coaxially aligned with respective rods 28. A diaphragm 40 forms a top part of the case or housing of each transistor, Q1 and Q2, and is mechanically linked to the piezoelectric emitter-base junction of the transistor (not shown). Diaphragm 40 is externally fixed to respective rods 28, which allows any motion of bar 27 to be coupled through diaphragm 40 to the piezoelectric junction as tension or compression thereon. A mechanical stop 42 of structure 22 prevents rods 28 from driving diaphragm 40 beyond the stress capacity of the piezotransistor. Housing 20, support structure 22, and displacement mechanism 26 are constructed from a nickel alloy noted principally for a very low coefficient of thermal expansion (approximately one micro-inch per inch per degree Fahrenheit).

The electrical circuit as shown in FIG. 2 includes piezotransistors Q1 and Q2. The emitters of Q1 and Q2 are connected together through a variable resistance 44. Resistance 44 comprises a low resistance potentiometer bridged by a fixed large valued resistor. Collector load resistors 46a and 46b and base biasing resistors 48a and 48b connect the respective base and collector of Q1 and Q2 to a common positive voltage source B+. The bases of Q1 and Q2 are further connected through respective resistors 49a and 49b to system or circuit ground 50. A Zener diode 52 and voltage dropping resistor 54 combine with a transistor Q3 to provide a constant current source for Q1 and Q2. The anode of diode 52 is connected to ground and to the emitter of Q3. The cathode of diode 52 is connected to the base of Q3 and through resistor 54 to B+. The collector of Q3 is connected to the variable arm of potentiometer 44. The collector of Q1 is further connected through a resistor 56 to a non-inverting input of a differential amplifier 60. The collector of Q2 connects through a resistor 58 to the inverting input of amplifier 60. A resistor 59 provides feedback from the output of amplifier 60 to the inverting input thereof and input resistors 56 and 58 establish the amplifier gain ratio. An amplifier output terminal 62 connects output signals to using circuitry such as angular rate-of-change indicators or auto-pilot control circuits.

Figure 3:
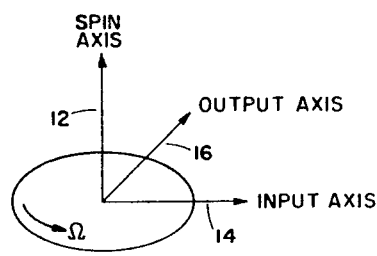
FIG. 3 is an illustration of the rate gyro axes.

FIG. 3 shows the relative position of the rate gyro axes. Input axis 14 and output axis 16 form a plane normal to spin axis 12. The direction of wheel rotation Ω is arbitrarily selected and can be in either direction around the spin axis. With no angular rate input the axes are aligned symmetrically with support structure 22. However, with an angular rate about input axis 14 some deviation occurs in the angular relationship between output axis 16 and support structure 22. Therefore, when reference is made to the normal relationship between the axes and the support structure, it is understood that slight variations may exist during operation of the gyro.

In operation, when gyro wheel 24 is uncaged and brought up to speed, the inner race of gyro support bearings 34 are supported through hub 30 by spring 31. Displacement mechanism 26 remains unmoved until an angular disturbance about the input axis causes precession about the output axis. In the electrical sensor circuitry, the output signal of amplifier 60 is nulled to zero by adjusting variable resistance 44 so that the collector signals on Q1 and Q2 are identical. Diode 52 and resistor 54 maintain the base of transistor Q3 at a fixed potential and Q3 is held in a conductive state. Transistors Q1 and Q2 are conductively biased, conducting through trim resistance 44 and Q3. An unbalance in the system is indicated as an output signal on terminal 62 of amplifier 60.

An angular rate about input axis 14 attempts to roll the gyro about this axis and results in a precession of the gyro about output axis 16. A stress is produced in spring 31 that is proportional to the input angular rate. Gyro wheel 24 attempts to remain in rotation about the preselected spin axis resulting in movement of support structure 22 with respect to displacement mechanism 26. This motion is about the output axis 16. The gyroscopic torques are applied to the force sensitive piezotransistors through rods 28. A precession of gyro wheel 24 about output axis 16 displaces lever arm $l$ through a small angle with spin axis 12. The displacement of the lever arm through a small angle is reflective of position displacement of gyro housing 20 and support structure 22 with respect to the spinning wheel. Displacement mechanism 26, being fixed to the inner ball bearing race of wheel 24, does not spin with wheel 24 and pivots on spring 31 about the same axial point as bearings 34 during precession. Thus, position deviation of support structure 22 is also a deviation with respect to displacement mechanism 26. Since the deviation is a precession about the output axis, transistors Q1 and Q2 are placed in compression and tension. Since the forces applied to Q1 and Q2 are reversible, either transistor is subjected to compression or tension when the other is subjected to tension or compression, respectively.

The forces coupled through rods 28 flex piezotransistor diaphragms 40, resulting in stress on respective transistor piezoelectric junctions that produces a differential output voltage from the sensor combination. The differential signals on the collectors of Q1 and Q2 are coupled through resistors 56 and 58 to the inputs of differential amplifier 60 wherein algebraic summing is provided. The bias and quadratic nonlinearity signal coefficients are cancelled by inverting one input of amplifier 60, and the useful linear output level is doubled.

Only a small precession angle is required to produce full scale operation of the transistor differential circuit, the maximum gyro wheel deflection being about 6 microinches. Low output torque requirements permit the use of a wheel with a relatively low moment of inertia and a low wheel speed. A low wheel speed eliminates windage problems while a low wheel mass minimizes gravity sensitive errors. The pendulosity of the gyro wheel about the output axis is negligible in comparison to the restraining force of the spring hinge thereby reducing any rate input about the output axis to insignificance, respecting the system signal output. The gyro is packageable in less than 5 cubic centimeters at low cost and is capable of responding to a step function of 50 degrees per second in 1.9 milliseconds.

We claim:

1. A single axis rate gyro and angular pickoff comprising: a gyro housing; a gyro wheel enclosed in said housing; displacement mechanism responsive to attitude variations of said gyro wheel; first and second piezotransistor sensors responsive to said displacement mechanism for providing an electrical output signal proportional to the angular displacement rate of said gyro wheel, said piezotransistors having a diaphragm portion thereof for transferring stress forces to the piezoelectric junction thereof and being disposed an equal distance on opposite sides of the gyro spin axis in a first plane formed by the spin axis and the input axis of the gyro wheel; said displacement mechanism including a force transferring bar in biased pivotal relationship with said gyro housing for application of opposing forces to said sensors in response to attitude deviation of said gyro wheel and said bar, said bar having a center hub substantially coaxial with said spin axis and having first and second linking rods joined perpendicular thereto in said first plane substantially parallel with and equidistant from said spin axis and connected to respective diaphragms of said first and second piezotransistors for applying tension or compression forces thereto; a spring hinge substantially along the spin axis of said gyro for attaching the center hub of said bar to said support structure and whereby said biased pivotal relationship between said gyro housing and said bar is maintained; and a housing support structure for supporting said gyro wheel, sensors and displacement mechanism within said housing, said support structure including a vertical stop member adjacent said force transmitting bar and said piezotransistors for limiting the maximum bar deflection to prevent damage within said transistors.

2. A single axis rate gyro and solid state angular momentum sensing circuit for producing a conditional electrical output proportional to a gyro angular rate input and comprising: a gyro housing and support structure; a gyro wheel supported within said housing; a force transferring bar in biased pivotal relationship with said gyro support structure and responsive to attitude deviation of said wheel; first and second piezotransistor sensors disposed on said support structure adjacent said force transferring bar and responsive to opposing displacement forces thereof for providing a displacement proportional output signal, said sensors being disposed an equal distance on opposite sides of a gyro spin axis in a plane formed by said spin axis and the input axis of said gyro wheel; said force transferring bar having a center support hub substantially coaxial with said spin axis and having linking rods connected to said sensors for applying tension or compression forces thereto, said linking rods lying in said plane substantially parallel with said spin axis; said piezotransistors having a diaphragm portion thereof substanially axial with and connected to respective linking rods for transferring applied stress forces to the transistor piezoelectric junction; an operational amplifier having first and second inputs and an output proportional to the angular displacement rate of said gyro wheel, said piezotransistors having respective collectors connected as inputs to said operational amplifier; and a current source connected to the emitters of said piezotransistors for maintaining a predetermined adjustable conduction therethrough when no external forces are applied thereto.

3. A rate gyro and sensing circuit as set forth in claim 2 wherein said operational amplifier is a differential amplifier having an inverting and a non-inverting input connected respectively to said first and second piezotransistor collectors, said current source is grounded emitter transistor having the base connected to a power source and through a Zener diode in reverse to ground and the collector connected through a potentiometer to said piezotransistor emitters for maintaining current flow therethrough, and said piezotransistors are biased to a normally conductive state by a base potential thereon.

4. A rate gyro and sensing circuit as set forth in claim 3 and further comprising a spring hinge substantially along the spin axis of said gyro for attaching said force transferring member to said support structure in said biased pivotal relationship.

References Cited

UNITED STATES PATENTS

| | | | |
|---|---|---|---|
| 2,474,693 | 6/1949 | Rowe | 33—204D(X) |
| 3,339,421 | 9/1967 | Warnock | 74—5 |
| 3,469,458 | 9/1969 | Griffin et al. | 74—5.6X |

FOREIGN PATENTS

| | | | |
|---|---|---|---|
| 600,784 | 7/1934 | Germany | 33—204.15 |
| 971,984 | 10/1964 | Great Britain | 33—204A |

MANUEL A. ANTONAKAS, Primary Examiner

U.S. Cl. X.R.

74—5, 5.5